(12) United States Patent
Nelson

(10) Patent No.: US 7,654,569 B2
(45) Date of Patent: Feb. 2, 2010

(54) ROLLOVER PROTECTION SYSTEM FOR A MOTOR VEHICLE AND RELATED METHOD

(75) Inventor: Earl H. Nelson, West Haven, UT (US)

(73) Assignee: Autoliv ASP, Inc., Ogden, UT (US)

( * ) Notice: Subject to any disclaimer, the term of this patent is extended or adjusted under 35 U.S.C. 154(b) by 342 days.

(21) Appl. No.: 11/403,997

(22) Filed: Apr. 13, 2006

(65) Prior Publication Data
US 2007/0241547 A1    Oct. 18, 2007

(51) Int. Cl.
   *B60R 21/13*    (2006.01)
(52) U.S. Cl. .................................................. 280/756
(58) Field of Classification Search ................. 280/756; 180/274, 282; 296/187.03, 187.13, 193.06, 296/210; 102/530, 531
   See application file for complete search history.

(56) References Cited

U.S. PATENT DOCUMENTS

| | | | |
|---|---|---|---|
| 3,292,726 A * | 12/1966 | Jette, Jr. .................... 280/801.1 |
| 5,205,585 A * | 4/1993 | Reuber et al. ................ 280/753 |
| 5,553,890 A * | 9/1996 | Buhr et al. .................. 280/806 |
| 5,623,115 A | 4/1997 | Lauritzen et al. ............. 102/288 |
| 6,352,285 B1 * | 3/2002 | Schulte et al. ............... 280/756 |
| 7,198,294 B2 * | 4/2007 | Welch ......................... 280/756 |
| 2007/0205592 A1 * | 9/2007 | Parks et al. .................. 280/756 |

FOREIGN PATENT DOCUMENTS

EP    1 538 032 A1    10/2004

* cited by examiner

*Primary Examiner*—Paul N Dickson
*Assistant Examiner*—Robert A Coker
(74) *Attorney, Agent, or Firm*—Sally J Brown; Harness Dickey & Pierce (57) ABSTRACT

A reinforced frame having a roof member and a pillar includes a brace interconnected to the frame. The brace is moveable between a stowed position and a deployed position. The deployed position is defined by the brace extending diagonally between the pillar and the roof member.

34 Claims, 10 Drawing Sheets

ROLLOVER PROTECTION SYSTEM FOR A MOTOR VEHICLE AND RELATED METHOD

FIELD

The present teachings generally concern a rollover protection system for a motor vehicle. More particularly, the present teachings concern a rollover protection system that extends a brace diagonally between two structural members of a motor vehicle frame and a related method.

BACKGROUND

The statements in this section merely provide background information related to the present disclosure and may not constitute prior art.

A vehicle frame provides protection for the occupants during accident conditions. For example, the roof and the pillars of the frame are designed to cooperate to protect vehicle occupants during rollover conditions. The roof and pillars must provide sufficient structural rigidity to maintain the occupant compartment.

While various vehicle frames known in the pertinent art may have proven suitable for their intended purposes, there remains a need for continuous improvement in occupant protection.

SUMMARY

According to one aspect, the present teachings provide a reinforced frame for a motor vehicle. The reinforced frame includes a roof member and a pillar. The pillar and the roof member cooperate to partially define an occupant compartment. The brace is coupled to the frame for movement between a stowed position and a deployed position. In the stowed position, the brace is substantially outside the occupant compartment. In the deployed position, the brace diagonally extends between the roof member and the pillar member and thereby provides reinforcement to the frame.

According to another aspect, the present teachings provide an assembly for reinforcing a frame of a motor vehicle. The frame includes a roof member and a pillar partially defining an occupant compartment. The assembly includes a housing for attachment to the frame. The housing defines a guide cylinder. A piston is mounted in the guide cylinder for movement along a translation axis. A brace includes a first end coupled to the piston for rotation about a rotation axis substantially perpendicular to the translation axis.

According to yet another aspect, the present teachings provide a method of reinforcing a frame of a motor vehicle. The frame includes a roof member and a pillar. The roof member and the pillar partially define an occupant compartment. The method includes interconnecting a brace to the vehicle frame and stowing the brace in a stowed position at least substantially outside the occupant compartment. The method further includes moving the brace to a deployed position defining a diagonal brace between the pillar and the roof member.

Further areas of applicability of the present teachings will become apparent from the description and appended claims provided hereinafter. It should be understood that the detailed description and specific examples, while indicating the various examples of the present teachings, are intended for purposes of illustration only and are not intended to limit the scope of the teachings.

DRAWINGS

The present teachings will become more fully understood from the detailed description, the appended claims and the following drawings.

DESCRIPTION OF VARIOUS ASPECTS

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure. Moreover, recitation of multiple embodiments having stated features is not intended to exclude other embodiments having additional features, or other embodiments incorporating different combinations of the stated features.

With general reference to FIGS. 1 through 9 of the drawings, a rollover protection system in accordance with the present teachings is generally identified at reference character 10. In certain of the views, the rollover protection system 10 is shown operatively associated with a motor vehicle 12. The particular motor vehicle 12 shown in the drawings will be understood to be exemplary in nature. In this regard, the present teachings have application to various other motor vehicles.

Figure 2:
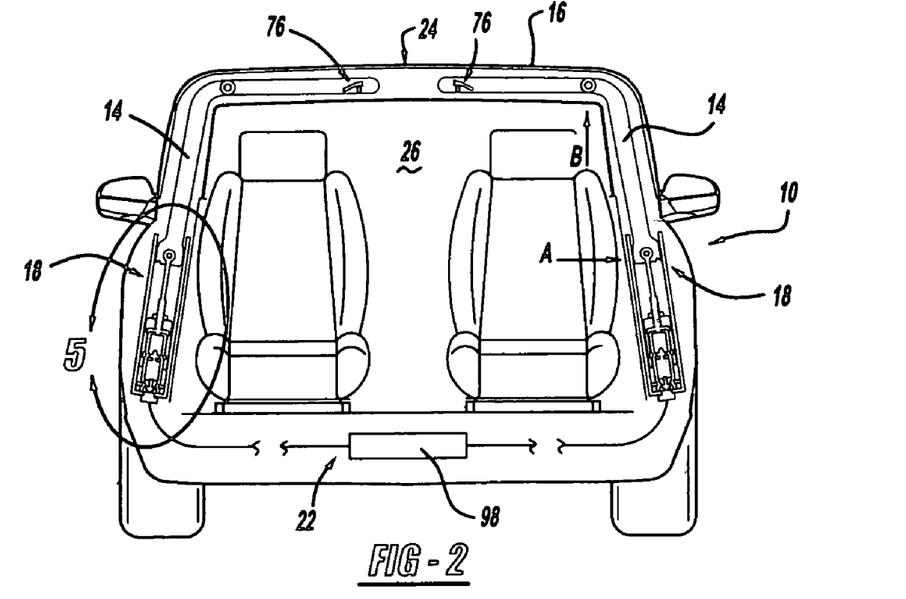
FIG. 2 is a diagram of the rollover protection system associated with an exemplary motor vehicle in accordance with the present teachings showing the rollover protection system in a stowed position, the motor vehicle shown simplified and partially cut away for purposes of illustration.
Figure 3:
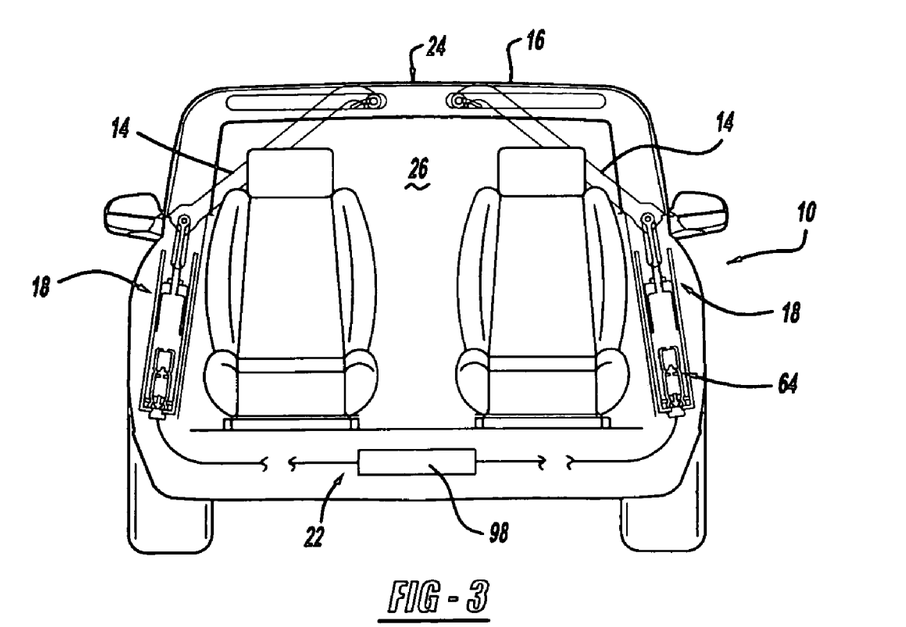
FIG. 3 is similar to FIG. 1 illustrating the rollover protection system in the deployed position having diagonal braces extending between the roof and structural pillars.

As will be addressed further below, the rollover protection system 10 may include one or more braces or brace members 14. The braces 14 may be moveable between stowed positions and deployed positions. The stowed positions are shown in FIG. 2, for example. The deployed positions are shown in FIG. 3, for example. In the deployed positions, the braces 14 may diagonally extend between a first member or roof member 16 of the frame 20 and a second member or pillar 18 of the frame 20. The braces 14 may be shown to reinforce the frame 20 of the vehicle 12 in the event the vehicle 12 encounters a rollover condition.

To the extent not further described, the frame 20 may be conventionally constructed to include a floor structure 22 that may include a floor pan, floor structural members, etc. The frame 20 may also include a roof structure 24 that may include roof structural members (e.g., roof member 16), a sunroof frame, etc. A plurality of vertical structural members 18, including the second member 18 of the frame 20, may extend between the floor structure 22 and the roof structure 24 of the frame 20. These vertical structural members are typically referred to in the industry as pillars 18. The frame 20, including the pillars 18 and the roof member 16, cooperate to define an occupant compartment 26 for the vehicle occupants.

It will be appreciated that many configurations of the frame 20 may be possible such as a uni-body construction, a body on frame construction, a tubular space frame and combinations thereof. Typically, the pillars 18 that extend between the roof structure 24 and the floor structure 22 of the frame 20 are referenced by their relative positions along the frame 20. In a typical sedan, for example, an A-pillar 18a is in the front of the vehicle 12, a B-pillar 18b is in the middle of the vehicle 12 and a C-pillar 18c is in the rear of the vehicle 12. In other vehicle configurations, additional pillars 18 may be possible such as a D-pillar 18d, etc. Again, vehicle 12 may be any class of vehicle including a car, a truck, a cargo van, a cart, a tractor, and others. Furthermore, the vehicle 12 may be any specific type thereof such as station wagons, pickup trucks, sport utility vehicles, crossover vehicles, passenger vans, service vehicles forklift, jitneys and others.

Figure 1:
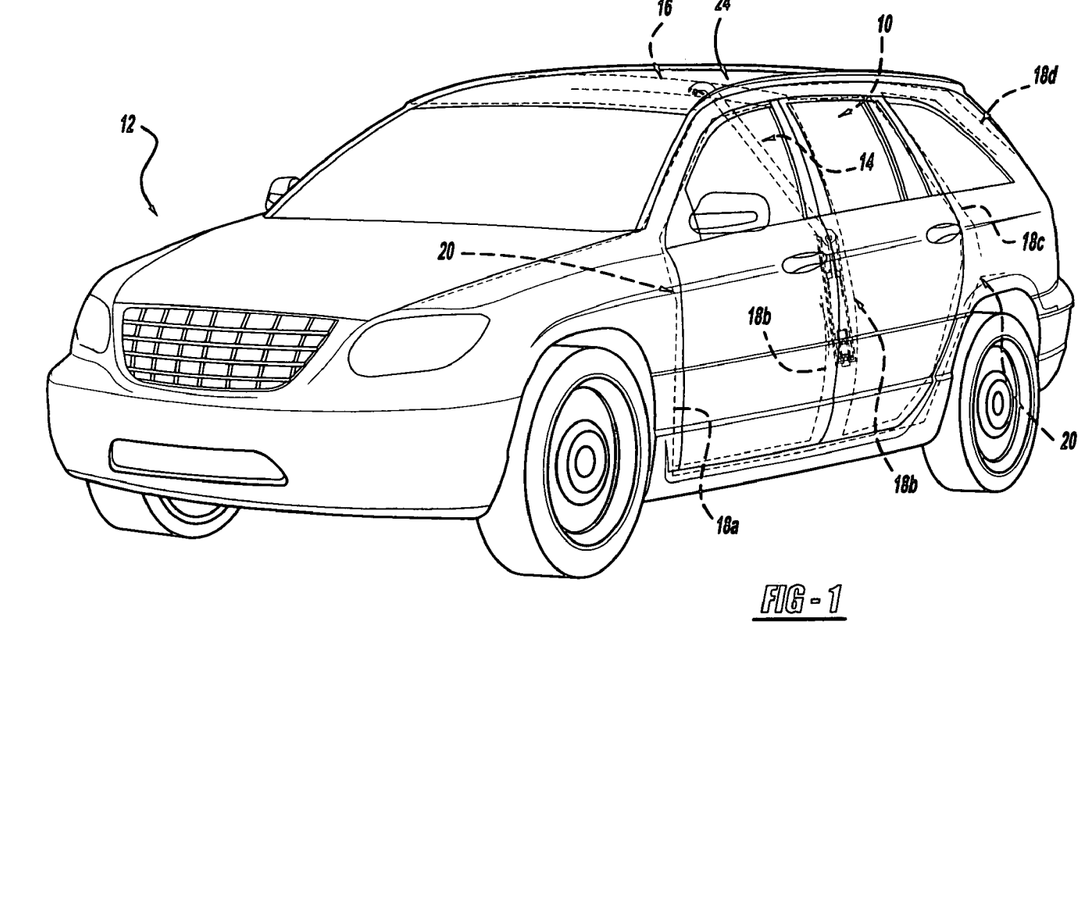
FIG. 1 is a perspective view of a rollover protection system operatively associated with an exemplary vehicle in accordance with the present teachings showing the rollover protection system in a deployed position having a diagonal brace extending between a roof member and a structural pillar.

The rollover protection system 10 may include at least one brace 14 mounted to the frame 20 for movement between stowed and deployed positions. As shown in FIGS. 1 through 3, the rollover protection system may include a pair of braces 14. The braces 14 may be additionally incorporated into any number of the pillars 18 of the vehicle 12. In one example, the braces 14 of the rollover protection system 10 may be incorporated into both of the B-pillars 18b of the vehicle 12.

The rollover protection system 10 as applied to lateral opposite sides of the vehicle 12 may be substantially identical. In this regard, the same brace 14 and associated components (as will be described below) may be utilized on both sides of the vehicle 12. In this manner, the number of distinct components of the rollover protection system 10 may be reduced. The remainder of the description of the rollover protection system need only be specifically directed to one of the braces and associated components and frame structure.

The brace 14 is interconnected to the frame 20 and may include a central portion 27 (see FIG. 4) extending between a first or trailing end 28 and a second or leading end 30. The central portion 27 may extend generally linearly. The brace 14 may be curved or angled adjacent the second end 30 so as to offset the second end 30 from a longitudinal axis defined by the central portion 27 of the brace 14. The brace 14 may be constructed of steel or other suitable materials having sufficient strength characteristics for bracing the frame 20 in the manner discussed herein.

Figure 4:
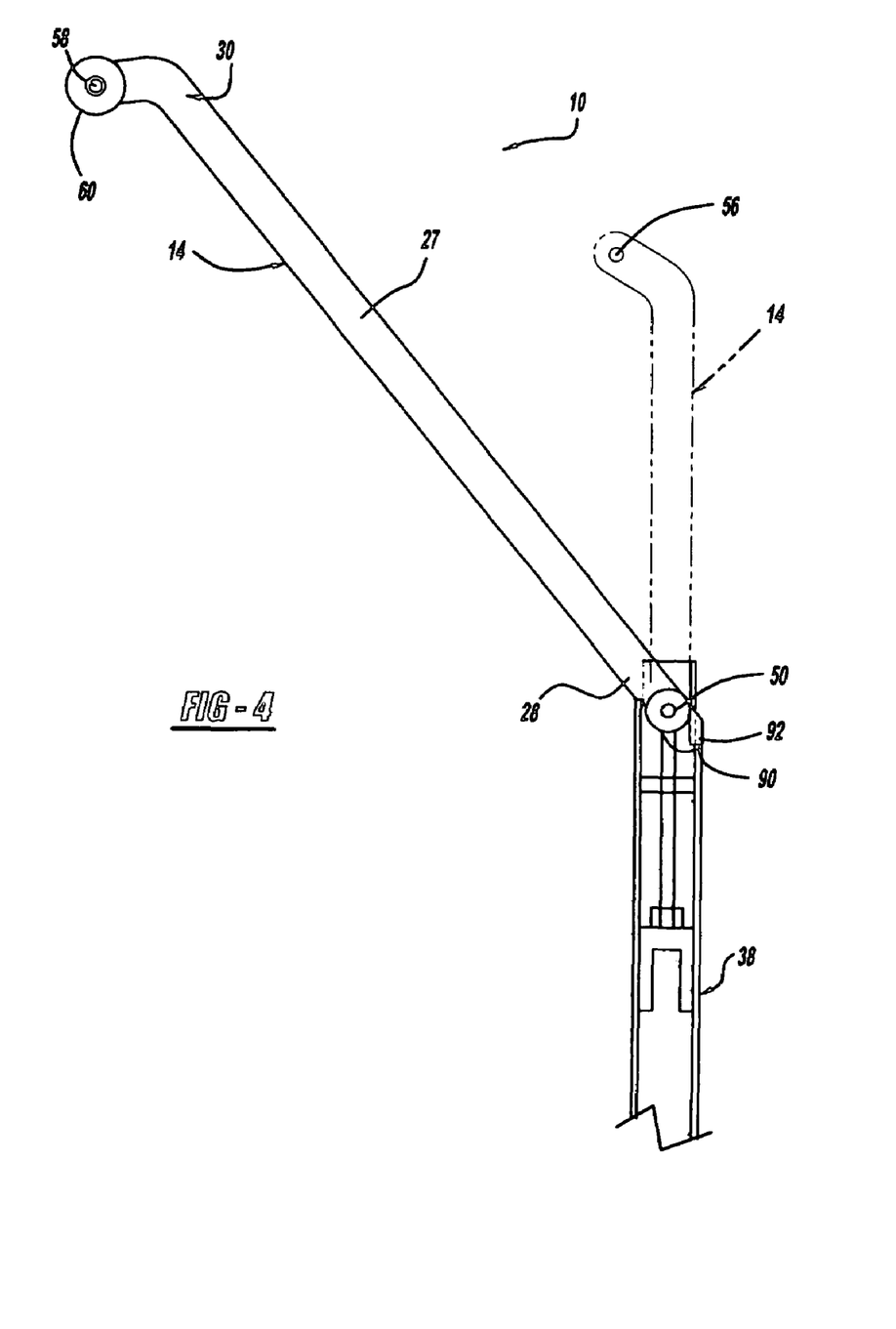
FIG. 4 is a front view of the rollover protection system in accordance with the present teachings showing in solid lines the brace in the deployed position and showing in phantom lines the brace in the stowed position.
Figure 5:
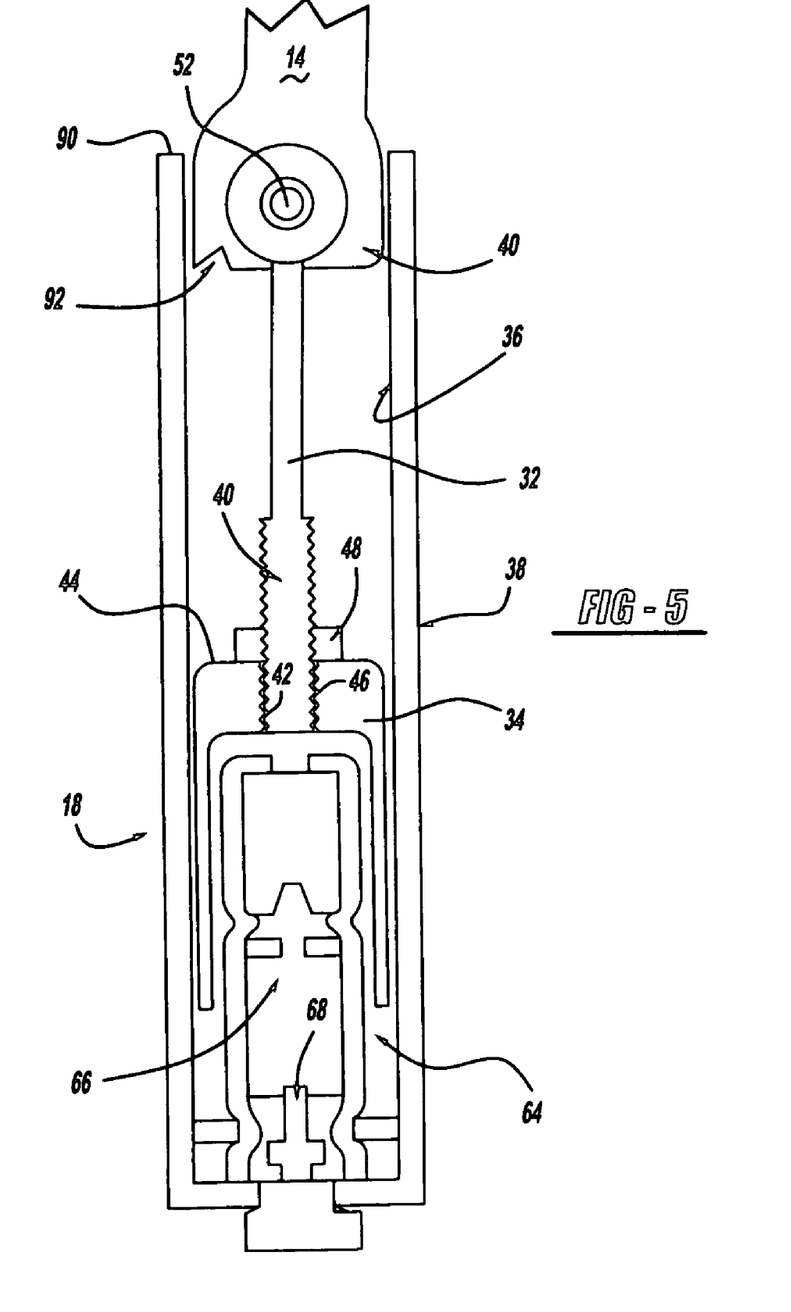
FIG. 5 is a detailed view of a portion of the rollover protection system of FIG. 2 showing a deployment system, a piston and a piston rod in a guide cylinder mounted within the structural pillar in accordance with the present teachings.
Figure 6:
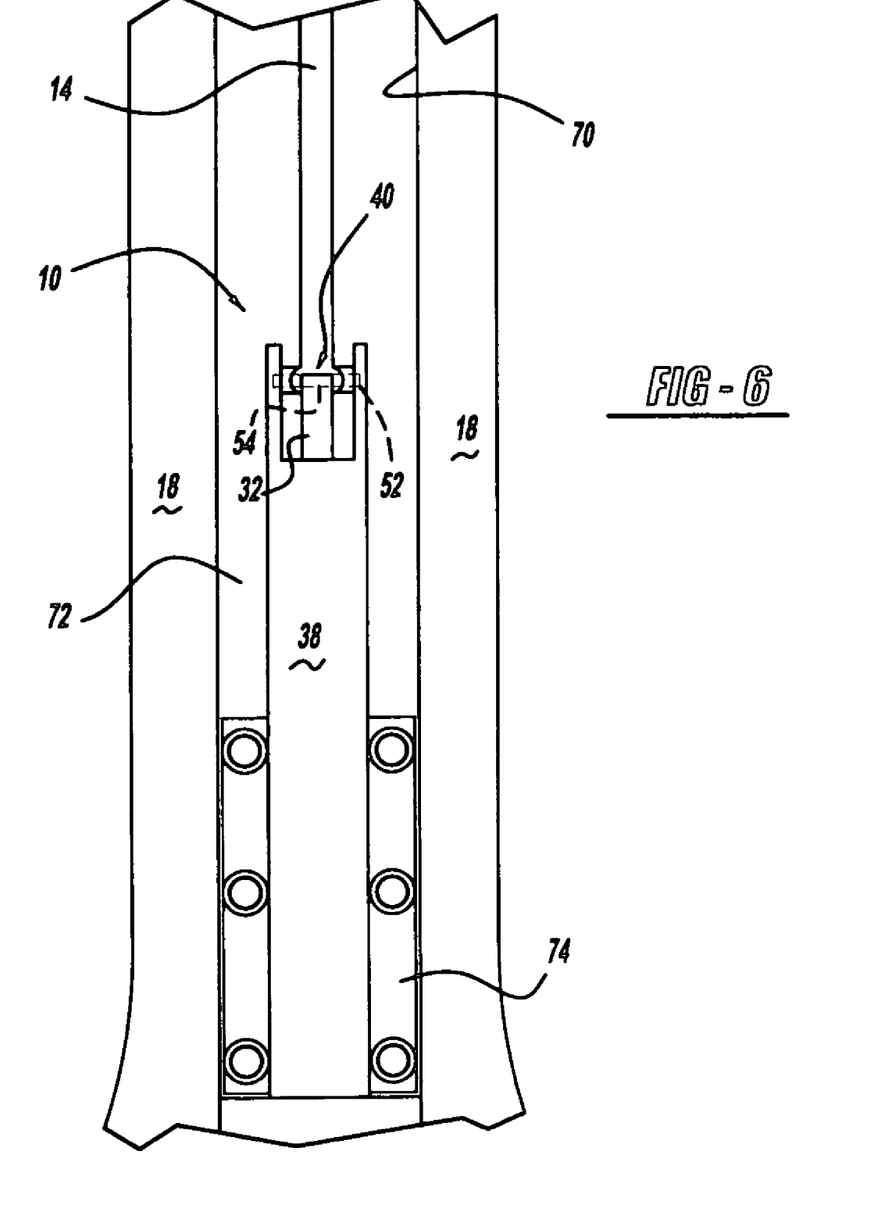
FIG. 6 is a view taken in the direction of Arrow A in FIG. 2 illustrating the brace and the guide cylinder mounted within the structural pillar in accordance with the present teachings.
Figure 7:
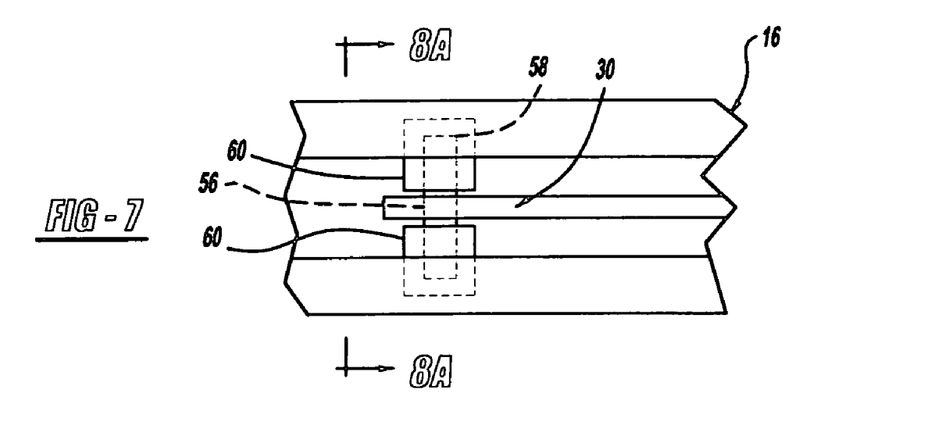
FIG. 7 is a view taken in the direction of Arrow B in FIG. 2 illustrating the first end of the brace connected to guide members contained within a channel in accordance with the present teachings.

With particular reference to FIGS. 4 through 6, the brace 14 may connect to an extension member 32, which also may be referred to as a piston rod 32. The piston rod 32 may connect to a piston 34 that may be guided for travel in a guide cylinder 36 (see FIG. 5) of a housing 38. An end of the piston rod 32 opposite of the brace 14 may be formed to include a threaded portion 40. The piston 34 may define an aperture 42 on a surface 44 adjacent the piston rod 32. The aperture 42 may be located generally in the center of the surface 44 of the piston 34 and may contain a complementary threaded portion 46. The aperture 42 may receive the threaded portion 40 of the piston rod 32 to secure the piston rod 32 to the piston 34. A lock nut 48 may be used to further secure the piston rod 32 to the piston 34.

In the various examples, welding, chemical bonding, additional fasteners, other suitable fastening techniques and combinations thereof may be used, as applicable, to secure the piston rod 32 to the piston 34. In certain applications, it may be desirable to couple the piston rod 32 and the piston 34 for relative rotation. In this regard, portions of the piston rod 32 and the piston 34 may be configured differently and may define complementary apertures that may similarly receive a pin to permit relative motion between the piston rod 32 and the piston 34.

With continued reference to FIGS. 4 through 6, the first end 28 of the brace 14 may also define an aperture 50 (see FIG. 4) formed through the brace 14 that may receive a pin 52. The piston rod 32 may additionally have an aperture 54 (see FIG. 6) that may receive the pin 52. The pin 52 may connect the piston rod 32 to the brace 14 and may permit relative rotation therebetween about an axis generally perpendicular to the travel of the rod 32. For certain applications, the pin 52 may journal one or more roller members (not shown) for rotation relative to the brace 14. The roller members may function similar to the roller members 60 discussed below for guiding the second end 30 relative to a channel of the pillar 18.

With reference to FIGS. 4 and 7 through 9C, the second end 30 of the brace 14 is configured to cooperate with the roof member 16 to guide the brace 14 to the deployed position. The second end 30 may have an aperture 56 (see FIG. 4) formed through the brace 14 that accepts a pin 58. The curved portion adjacent the second end 30 may offset the pin 58 from a longitudinal axis defined by the central portion 27 of the brace 14. The pin 58 may journal one or more roller members or guide members 60 for rotation relative to the brace 14.

The roof member 16 may include a channel 62 (shown in FIGS. 8A and 8B, for example) in which the roller members 60 may be disposed and retained. The roller members 60 may be configured to travel through the channel 62 as the brace 14 moves between the stowed position and the deployed position. Because the first end 28 of the brace 14 is permitted to rotate relative to the rod 32, the second end 30 may be permitted to move substantially in a linear direction which is perpendicular to the linear movement of the first end 28.

Figure 8A:
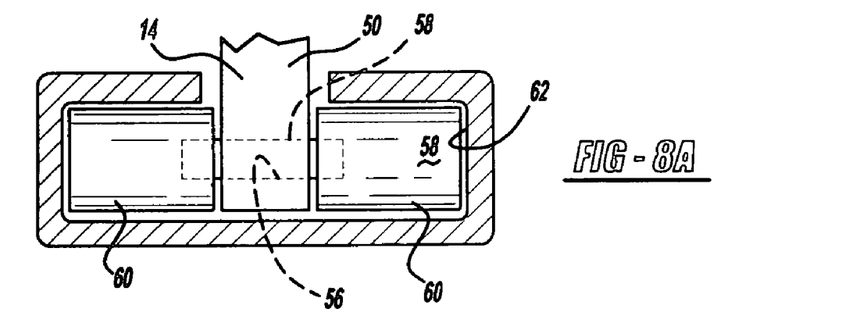
FIG. 8A is a cross-sectional view taken along the line 8A-8A of FIG. 7.
Figure 8B:
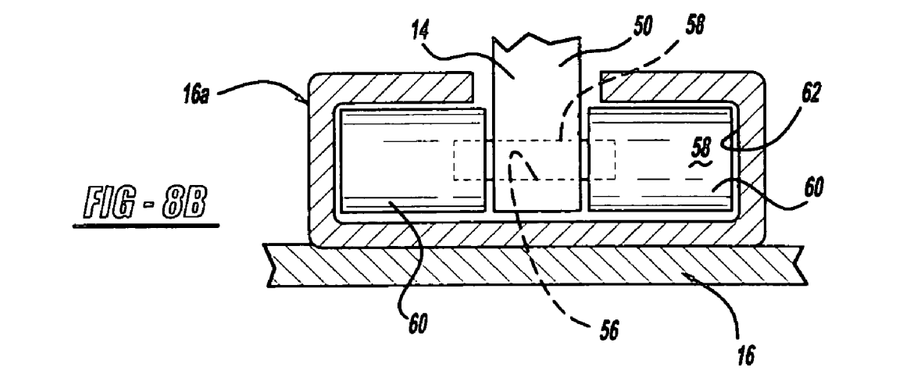
FIG. 8B is a cross-sectional view illustrating a channel of the roof member being defined by a separate component.

As shown in the cross-sectional view of FIG. 8A, the roof member 16 may be generally C-shaped and define the channel 62. The channel 62 may extend substantially along the length of the roof member 16. As shown in the cross-sectional view of FIG. 8B, the roof member 16 may alternatively be formed to include a separate component to define the channel 62. This separate component 16a may be welded or otherwise suitably secured to the remainder of the roof member 16.

The system 10 may additionally include a deployment system 64 disposed in the housing 38 for displacing the piston 34 relative to the guide cylinder 36. Displacement of the piston 34 may generally be linear along a translation axis. The deployment system 64 may be operative to generate a force to deploy the piston 34. The deployment system 64 may be activated to generate pressure within the guide cylinder 36 to advance the piston 34 upward toward the roof member 16 to thereby deploy the brace 14 from the stowed position to the deployed position.

The deployment system 64 may include a propellant or gas generant 66 (i.e., a gas producing material) and an ignitiator or igniter 68 to ignite the gas generant 66. The gas generant 66 may be composed of various suitable solid and/or liquid chemicals that, when ignited by the igniter or other suitable igniter systems, sufficiently produces a volume of combustion gases to increase pressure within the guide cylinder 36. The instantaneously increase in pressure upwardly displaces the piston 34.

Insofar as the gas generant 66 and igniter 68 are concerned, similar technology is used in connection with the inflation of vehicle airbags. Commonly assigned U.S. Pat. No. 5,623,115 describes various aspects of related technology which may be incorporated into the deployment system 64 for the displacement of piston 34. U.S. Pat. No. 5,623,115 is hereby incorporated by reference as if fully set forth herein. Further details of the gas generant 66 and the igniter 68 will be understood to be outside the scope of the present disclosure.

Portions of the rollover protection system 10 may be contained within the pillar 18 and thereby positioned outside the occupant compartment 26. The pillar 18 may define a channel 70 including an internal surface 72. In this regard, the brace 14, the piston 34, the housing 38 and the deployment system 64 define an assembly that may be contained within the pillar 18. The housing 38 may be associated with a mounting bracket 74. As shown in FIG. 6, the mounting bracket 74 may be attached to the pillar 18 within the channel 70. Alternatively, the mounting bracket 74 may be secured to an external surface of a conventionally constructed or mounted within a separately formed channel secured to the pillar 18. In each of the above installations, the mounting bracket 74 may be used with suitable fasteners, welding, chemical bonding or combinations to secure the assembly relative to the pillar 18.

In the above described manner, the components of the rollover protection system 10 may be mounted within the frame 20 so as not to extend within the occupant compartment 26 prior to deployment. The drawings are illustrated throughout with the headliner and interior trim components that conventionally cover the roof structure 24 and pillars 18 removed for purposes of illustration. Portions of the headliner and interior trim components may be configured to open and/or breakaway as the braces 14 move to the deployed positions. The braces 14 may include padding secured to a suitable surface of the brace 14 that extends into the occupant compartment 26 upon deployment. Alternatively, the headliner may be displaced into the passenger compartment to provide a level of cushioning.

Figure 9A:
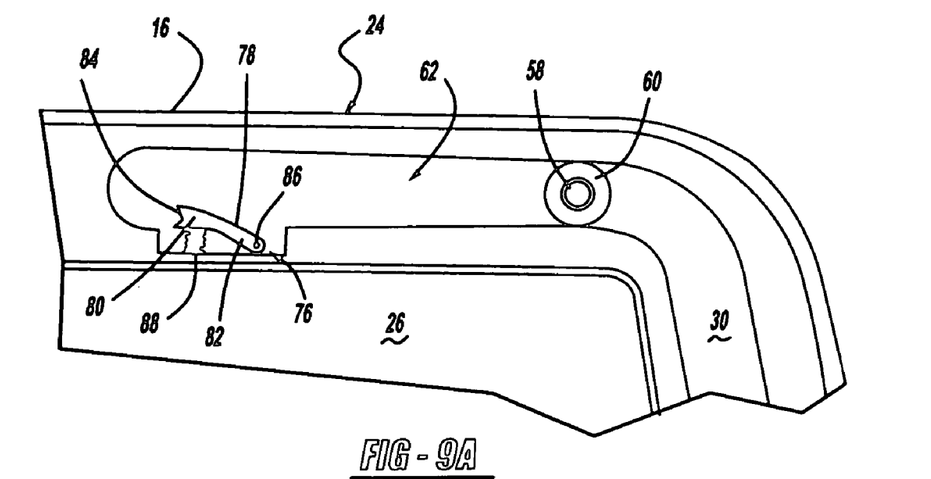
FIG. 9A is a diagram of a front view from FIG. 1, the guide member carried at the first end of the brace contained within the channel, the brace illustrated in the stowed position.
Figure 9B:
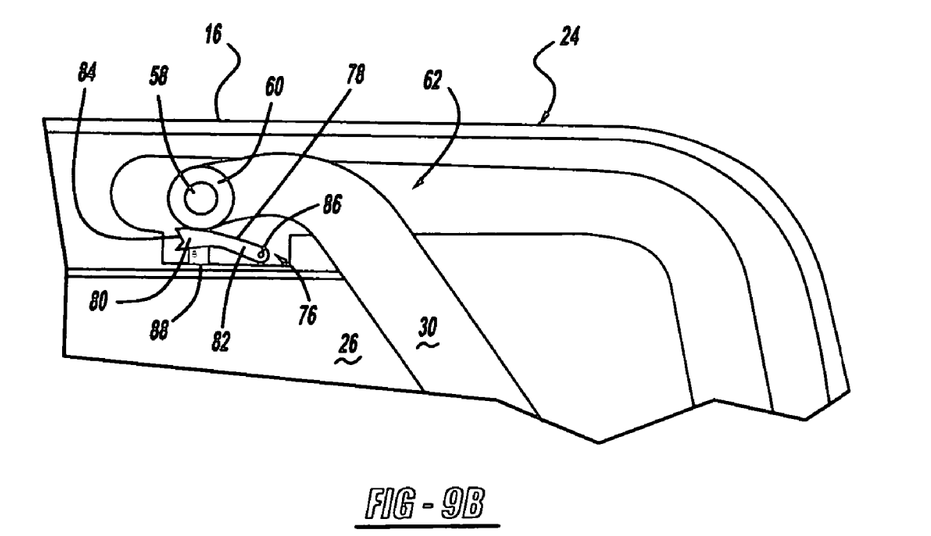
FIG. 9B is similar to FIG. 9A illustrating the guide members compressing a catch assembly as the brace moves from the stowed position to the deployed position in accordance with the present teachings.
Figure 9C:
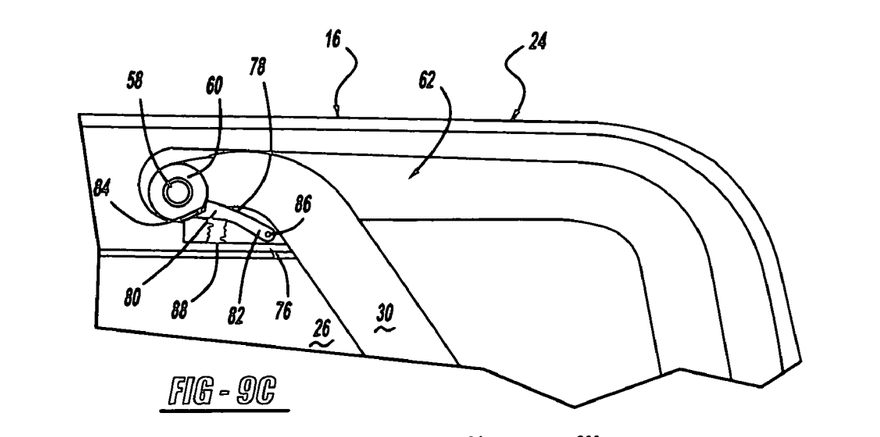
FIG. 9C is similar to FIG. 9A illustrating the brace in the deployed position with the guide members retained by the catch assembly.

With reference to FIGS. 9A through 9C, a catch assembly 76 may be carried by the roof member 16. The catch assembly 76 may be operative to retain the second end 30 of the brace 14 when the brace 14 is in the deployed position (see FIG. 9C). The catch assembly 76 may include a ramp 78 having a first end 80 and a second end 82. The second end 82 may be positioned between the first end 80 and the second end 30 of the brace 14 when the brace 14 is in the stowed position, as shown in FIG. 9A. The first end 80 may have a cupped portion 84. A pin 110 may journal the second end 82 for rotation relative to the roof member 16.

A biasing member 88 may bias the ramp 78 toward an upward position (FIGS. 9A and 9C). The biasing member may be a spring 88. As the second end 30 of the brace 14 travels from the stowed position (FIG. 9A) to the deployed position (FIG. 9C), the second end 30 and/or the roller members 60 connected thereto may contact the ramp 78 and urge the ramp 78 against the spring bias to pivot about the pin 86 downward into a retracted position (FIG. 9B). In a retracted position, the ramp 78 permits the roller members 60 and the second end 30 of the brace to pass over the catch assembly 76.

With reference to FIG. 9B, the ramp 78 in the retracted position may permit the second end 30 of the brace 14 to travel beyond the ramp 78. With reference to FIG. 9C, as the second end 30 and the roller members 60 clear the ramp 78, the spring 88 may urge the ramp 78 back to the upward position. The cupped portion 84 then may engage the roller members 60 and/or the second end 30 of the brace 14. Once the roller members 60 and/or the second end 30 of the brace 14 are held by the cupped portion 84 of the catch assembly 76, the brace 14 may be securely held in the deployed position and is thus unable to return to the stowed position.

The catch assembly 76 provides an inexpensive and reliable structure for retaining the second end 30 of the brace relative to the frame 20. Other structures known in the art can be alternatively used to engage and retain the second end 30. Important insofar as the catch assembly 76 is concerned is that the device be operative to assist in the preservation of the deployed position of the brace 14 during a vehicle rollover.

With particular reference to FIGS. 4 and 5, the first end 28 of the brace 14 and an upper end 90 or portion of the housing 38 may cooperate to further retain the brace 14 in the deployed position. The first end 28 of the brace 14 may include a notch portion 92. The notch portion 92 may be urged to come into contact with the upper portion 90 of the wall of the housing 38 when the brace 14 is in the deployed position. In this regard, the notch portion 92 may be received by the upper end 90 of the housing 38. When the notch portion 92 receives the wall of the housing 38, the brace 14 may be secured in the deployed position. As such, the brace 14 may remain locked in the deployed position and unable to return to the stowed position.

Figure 10:
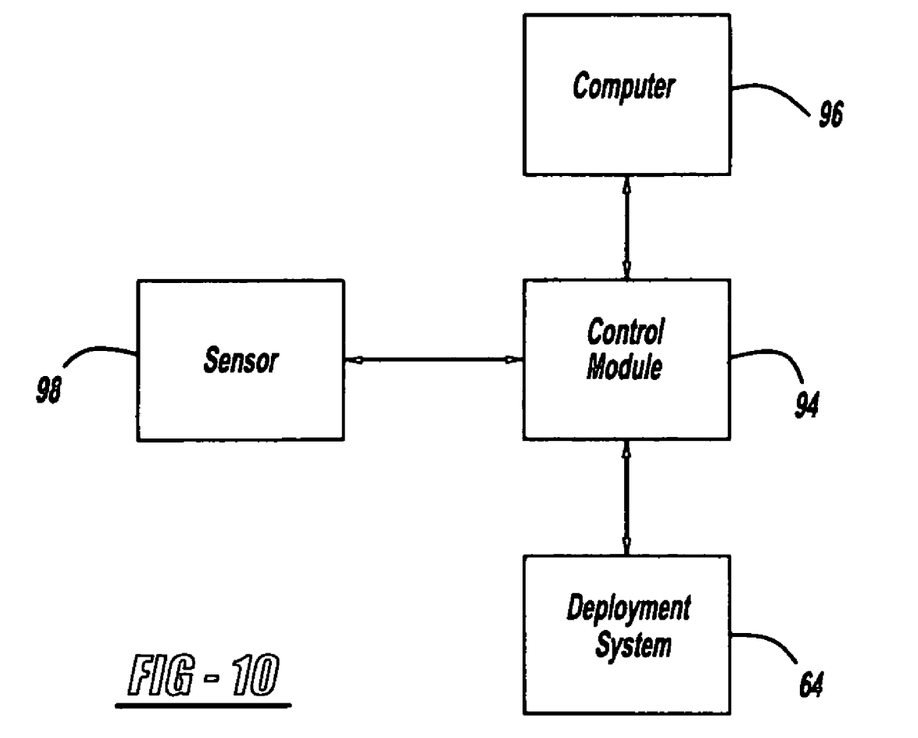
FIG. 10 is a schematic illustration of an exemplary control system that detects a rollover condition and activates the deployment system.

With particular reference to the schematic view of FIG. 10, the system 10 may additionally include a control module 94 in electrical communication with a vehicle computer 96 and a sensor 98. The sensor 98 may be configured to detect a predetermined vehicle event or condition. The sensor 98 may conventionally function to detect when a rollover condition of the vehicle 12 is likely. For example, the sensor 98 may be configured to detect a departure angle from a normal inclination of the vehicle 12 or other vehicle characteristic indicative of rollover. The sensitivity of the sensor 98 may be configured to detect the rollover condition in time to deploy the rollover protection system 10 (on the order of milliseconds) and thus move the braces 14 from the stowed positions to the deployed positions. The braces 14 may be in the deployed positions before the vehicle 12 becomes inverted from its normal orientation.

In operation, the sensor 98 may detect the likelihood of a rollover condition prior to actual rollover of the vehicle 12. Once the likelihood of the rollover condition is detected, the control module 94 may activate the deployment system 64. Upon activation of the deployment system 64, the igniter 68 ignites the generant 66 causing combustion gases to form and raise the internal pressure within the guide cylinder 36 thus urging the piston 34 upward. By urging the piston 34 upward, the piston rod 32 urges the brace 14 out of the guide cylinder 36 and upward toward the roof member 16.

Figure 11:
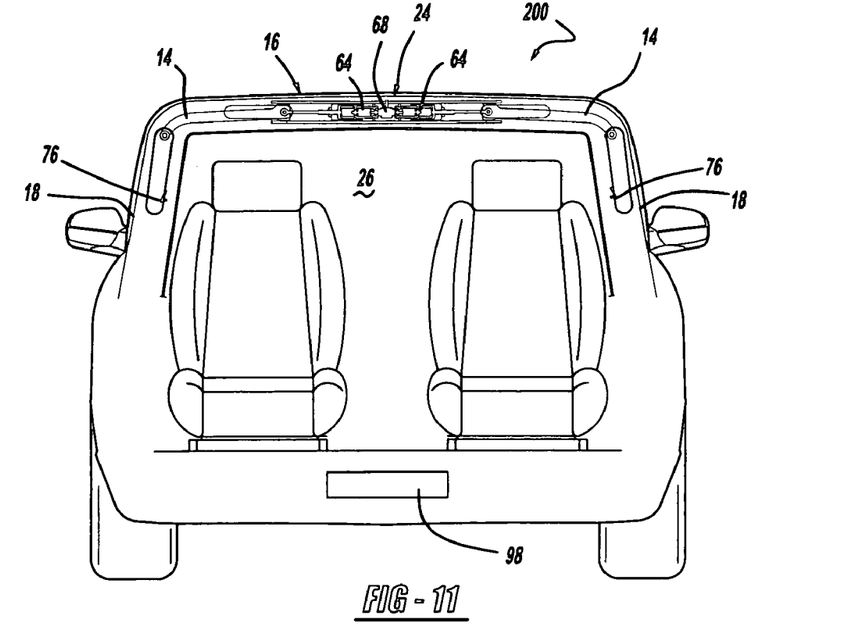
FIG. 11 is a view similar to FIG. 2 illustrating another rollover protection system in accordance with the present teachings, the rollover protection system including a deployment system carried in the roof member that deploys a pair of brace members, the rollover protection system illustrated in a stowed position, the motor vehicle shown simplified and partially cut away for purposes of illustration.
Figure 12:
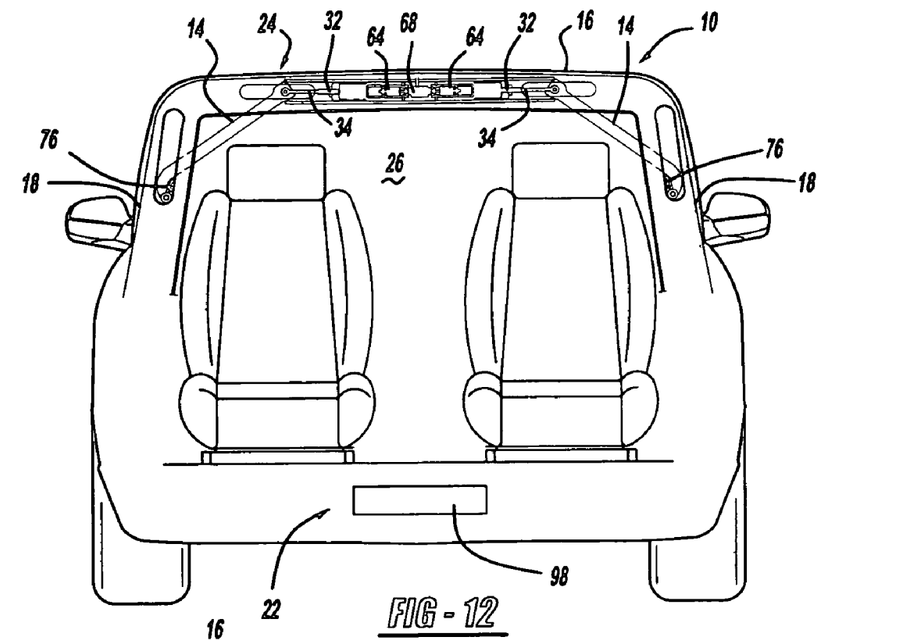
FIG. 12 is similar to FIG. 11 illustrating the rollover protection system in the deployed position having the diagonal braces extended between the roof member and the structural pillars.
Figure 13:
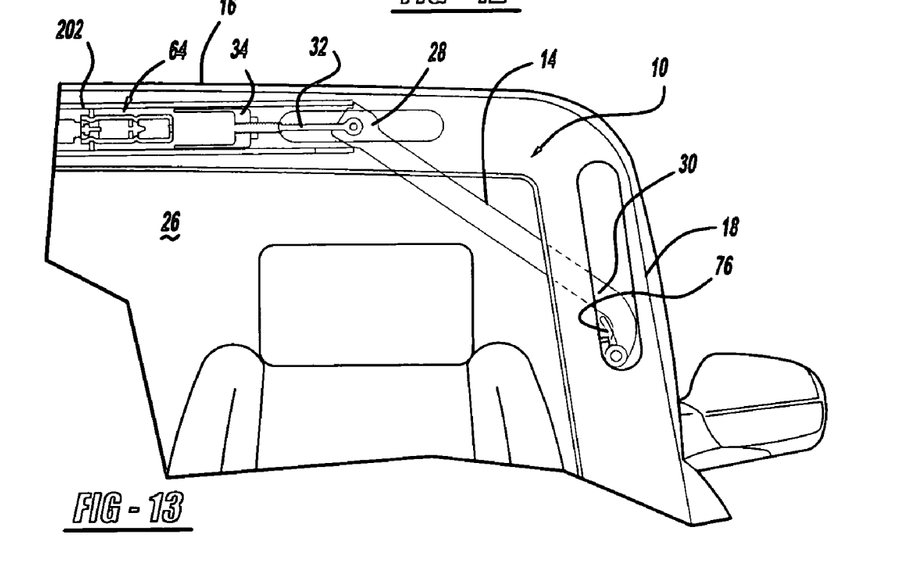
FIG. 13 is a detailed view of a portion of FIG. 11 further illustrating the channels in which the roller members travel.

Turning to FIGS. 11 through 13, another rollover protection system in accordance with the present teachings is illustrated and generally identified at reference character 200. The rollover protection system 200 shares various components with the system 10. Similar reference characters will be used in FIGS. 11 through 13 to identify similar components between the systems 200 and 10. Structure and function not specifically described with respect to the system 200 will be understood to be substantially identical to the system 10.

The rollover protection system 200 primarily differs from the system 10 in that the braces 14 are substantially aligned with the roof member 16 in the stowed positions rather than the pillars 18. The braces 14 may move from stowed positions to deployed positions by moving downward from the roof member 16 into a pillar 18 instead of moving up the pillar 18 toward the roof member 16 as illustrated in FIGS. 2 and 3. The first end 28 (see FIG. 13) of each of the braces 14 translate generally in a horizon direction along the roof member 16. As the first end 28 is again rotatably coupled to the piston rod 32. The second end 30 (see FIG. 13) may translate generally in a vertical direction along the pillar 18.

As illustrated, the rollover protection system 200 may include a common housing 202. The common housing 202 is similar to housing 38 except that it is adapted to functionally retain a pair of pistons 34, a pair of piston rods 32, and a pair of deployment systems 64. The deployment systems 64 may be associated with individual igniters 68 or a common igniter 68. In either case, a common control signal from the sensor 98 may be utilized to initiate deployment of the two braces 14.

In certain applications, it may be desirable to incorporate a common gas generant for moving the braces 14 from their stowed positions to their deployed positions. In such alternative applications, a common housing may functionally retain a pair of pistons. The gas generant may be disposed within a fluid tight chamber disposed between the pair of pistons such that activation of the common gas generant may function to advance the associated pistons in opposite directions. Such an alternative application may be otherwise substantially identical in construction and function to the system 200 shown in FIGS. 11 through 13.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification, as the best mode of presently contemplated for carrying out the present teachings but that the scope of the present disclosure will include any embodiments following within the foregoing description and the appended claims.

What is claimed is:

1. An assembly for reinforcing a frame of a motor vehicle, the frame including a roof member and a pillar partially defining an occupant compartment, the assembly comprising:
   a housing for non-rotatable attachment to the frame, the housing defining a guide cylinder;
   a piston mounted in the guide cylinder for movement along a translation axis, the translation axis being fixed relative to the frame; and
   a brace including a first end coupled to the piston for rotation about a rotation axis, the rotation axis being substantially perpendicular to the translation axis.

2. The assembly for reinforcing a frame of a motor vehicle of claim 1, further comprising a deployment system disposed in the housing for displacing the piston relative to the guide cylinder along the translation axis.

3. The assembly for reinforcing a frame of a motor vehicle of claim 2, wherein the deployment system includes a gas generant disposed in the housing for generating a volume of gas to displace the piston.

4. The assembly for reinforcing a frame of a motor vehicle of claim 3, wherein the deployment system further includes an igniter proximate to the gas generant for igniting the gas generant to generate the volume of gas.

5. The assembly for reinforcing a frame of a motor vehicle of claim 2, further comprising a control system coupled to the deployment system for activating the deployment system.

6. The assembly for reinforcing a frame of a motor vehicle of claim 5, wherein the control system is operative to automatically activate the deployment system in response to a predetermined vehicle event.

7. The assembly for reinforcing a frame of a motor vehicle of claim 5, wherein the control system include a sensor for sensing a predetermined vehicle condition and automatically activating the deployment system in response to the predetermined vehicle condition.

8. The assembly for reinforcing a frame of a motor vehicle of claim 7, wherein the sensor is operative for sensing a rollover condition of the motor vehicle.

9. The assembly for reinforcing a frame of a motor vehicle of claim 1, wherein the brace includes a second end having a guide member for guiding the brace relative to the frame and thereby rotating the brace about within the rotation axis plane.

10. The assembly for reinforcing a frame of a motor vehicle of claim 1, wherein one of the first end and a second end of the brace is interconnected to the pillar for generally linear movement along the pillar and the other of the first end and the second end is interconnected to the roof member for generally linear movement along the roof member.

11. The assembly for reinforcing a frame of a motor vehicle of claim 10, wherein the housing is attached to the roof member and a second end of the brace is coupled to the pillar.

12. The assembly for reinforcing a frame of a motor vehicle of claim 10, wherein the housing is attached to the pillar and a second end of the brace is coupled to the roof member.

13. The assembly for reinforcing a frame of a motor vehicle of claim 1, wherein the brace is coupled to the frame for movement between a stowed position and a deployed position, the brace being substantially outside the occupant compartment when in the stowed position and the brace diagonally extending between the roof member and pillar when in the deployed position.

14. The assembly for reinforcing a frame of a motor vehicle of claim 13, further comprising a deployment system carried by the frame and coupled to the brace, the deployment system operative to automatically move the brace from the stowed position to the deployed position in response to a predetermined vehicle condition.

15. The assembly for reinforcing a frame of a motor vehicle of claim 14, further comprising a sensor coupled to the deployment system for sensing the predetermined vehicle condition and automatically activating the deployment system in response to the predetermined vehicle condition.

16. The assembly for reinforcing a frame of a motor vehicle of claim 14, wherein the sensor is operative for sensing a rollover condition of the motor vehicle.

17. The assembly for reinforcing a frame of a motor vehicle of claim 13, wherein one of the first end and a second end of the brace is interconnected to the pillar for generally linear movement along the pillar and the other of the first end and the second end is interconnected to the roof member for generally linear movement along the roof member.

18. The assembly for reinforcing a frame of a motor vehicle of claim 1, wherein the roof member extends between first and second sides of the motor vehicle in a lateral direction and the brace rotates within a plane parallel to the lateral direction.

19. The assembly for reinforcing a frame of a motor vehicle of claim 1, in combination with the frame, the housing being non-rotatably attached to the frame.

20. An assembly for reinforcing a frame of a motor vehicle, the frame including a roof member and a pillar partially defining an occupant compartment, the assembly comprising:
  a housing for attachment to the frame, the housing defining a guide cylinder;
  a piston mounted in the guide cylinder for movement along a translation axis; and
  a brace including a first end coupled to the piston for rotation about a rotation axis, the rotation axis being substantially perpendicular to the translation axis;
  wherein one of the first end and a second end of the brace is interconnected to the pillar for generally linear movement along the pillar and the other of the first end and the second end is interconnected to the roof member for generally linear movement along the roof member.

21. The assembly for reinforcing a frame of a motor vehicle of claim 20, further comprising a deployment system disposed in the housing for displacing the piston relative to the guide cylinder along the translation axis.

22. The assembly for reinforcing a frame of a motor vehicle of claim 21, wherein the deployment system includes a gas generant disposed in the housing for generating a volume of gas to displace the piston.

23. The assembly for reinforcing a frame of a motor vehicle of claim 21, further comprising a control system coupled to the deployment system for activating the deployment system.

24. The assembly for reinforcing a frame of a motor vehicle of claim 23, wherein the control system is operative to automatically activate the deployment system in response to a predetermined vehicle event.

25. An assembly for reinforcing a frame of a motor vehicle, the frame including a roof member and a pillar partially defining an occupant compartment, the assembly comprising:
  a housing for attachment to the frame, the housing defining a guide cylinder;
  a piston mounted in the guide cylinder for movement along a translation axis; and
  a brace including a first end coupled to the piston for rotation about a rotation axis, the rotation axis being substantially perpendicular to the translation axis;
  wherein the brace is coupled to the frame for movement between a stowed position and a deployed position, the brace being substantially outside the occupant compartment when in the stowed position and the brace diagonally extending between the roof member and pillar when in the deployed position.

26. The assembly for reinforcing a frame of a motor vehicle of claim 25, further comprising a deployment system disposed in the housing for displacing the piston relative to the guide cylinder along the translation axis.

27. The assembly for reinforcing a frame of a motor vehicle of claim 26, wherein the deployment system includes a gas generant disposed in the housing for generating a volume of gas to displace the piston.

28. The assembly for reinforcing a frame of a motor vehicle of claim 26, further comprising a control system coupled to the deployment system for activating the deployment system.

29. The assembly for reinforcing a frame of a motor vehicle of claim 28, wherein the control system is operative to automatically activate the deployment system in response to a predetermined vehicle event.

30. An assembly for reinforcing a frame of a motor vehicle, the frame including a roof member and a pillar partially defining an occupant compartment, the assembly comprising:
  a housing defining a guide cylinder;
  a piston mounted in the guide cylinder; and
  a brace rotatable by the piston and including a first end and a second end, the first end interconnected to the roof for relative movement along a first the second end interconnected to the pillar for relative translation along a second longitudinal axis, the first axis extending laterally across the motor vehicle.

31. The assembly for reinforcing a frame of a motor vehicle of claim 30, further comprising a deployment system disposed in the housing for displacing the piston relative to the guide cylinder along the translation axis.

32. The assembly for reinforcing a frame of a motor vehicle of claim 31, wherein the deployment system includes a gas generant disposed in the housing for generating a volume of gas to displace the piston.

33. The assembly for reinforcing a frame of a motor vehicle of claim 32, further comprising a control system coupled to the deployment system for activating the deployment system.

34. The assembly for reinforcing a frame of a motor vehicle of claim 33, wherein the control system is operative to automatically activate the deployment system in response to a predetermined vehicle event.

\* \* \* \* \*